(12) United States Patent
Dixon

(10) Patent No.: US 7,581,043 B2
(45) Date of Patent: Aug. 25, 2009

(54) DYNAMIC BUFFER SIZE ALLOCATION FOR MULTIPLEXED STREAMING

(75) Inventor: Robert W. Dixon, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 43 days.

(21) Appl. No.: 11/290,061

(22) Filed: Nov. 30, 2005

(65) Prior Publication Data

US 2006/0080482 A1    Apr. 13, 2006

Related U.S. Application Data

(63) Continuation of application No. 09/894,518, filed on Jun. 27, 2001, now Pat. No. 6,993,604.

(60) Provisional application No. 60/249,007, filed on Nov. 15, 2000.

(51) Int. Cl.
*G06F 3/00* (2006.01)

(52) U.S. Cl. .............................. 710/52; 710/53; 710/54; 710/55; 710/56; 710/57

(58) Field of Classification Search ...................... None
See application file for complete search history.

(56) References Cited

U.S. PATENT DOCUMENTS

| | | | | |
|---|---|---|---|---|
| 5,861,894 A * | 1/1999 | Sotheran et al. | ............. | 345/573 |
| 6,098,123 A * | 8/2000 | Olnowich | ..................... | 710/41 |
| 6,188,670 B1 * | 2/2001 | Lackman et al. | ............ | 370/231 |
| 6,219,728 B1 * | 4/2001 | Yin | .............................. | 710/52 |
| 6,389,489 B1 * | 5/2002 | Stone et al. | .................... | 710/57 |
| 6,728,253 B1 * | 4/2004 | Jeffries et al. | ................ | 370/412 |
| 2004/0054823 A1 * | 3/2004 | Rooney | ........................ | 710/33 |

* cited by examiner

*Primary Examiner*—Alan Chen
(74) *Attorney, Agent, or Firm*—David K. Lucente

(57) ABSTRACT

A method and disc drive are disclosed that employ dynamic buffer size allocation for handling multiple data streams, such as time-sensitive audio/video data. The method involves allocating a certain amount of required buffer space for each data stream to be handled without an interruption in recording or playing back the data stream. The method further involves reallocating the amount of required buffer space for each stream including any additional stream when one or more additional streams are to be added to the total number of streams being handled. The method also involves reallocating the amount of required buffer space for each stream including those streams that remain after any of the data streams being handled are terminated.

19 Claims, 3 Drawing Sheets

DYNAMIC BUFFER SIZE ALLOCATION FOR MULTIPLEXED STREAMING

RELATED APPLICATIONS

This application is a continuation of U.S. patent application Ser. No. 09/894,518, filed Jun. 27, 2001, which claims priority to U.S. Provisional Application Ser. No. 60/249,007, filed Nov. 15, 2001, the entire contents of both of which are incorporated herein by reference.

FIELD OF THE INVENTION

This application relates generally to disc drive buffering and more particularly to a disc drive that dynamically allocates the buffer size for multiple data streams.

BACKGROUND OF THE INVENTION

Disc drives employ buffers to allow data to be prefetched from the disc before being requested by the host computer or to temporarily hold data prior to it be written to the disc or supplied to a host computer. The buffer allows the data to be written to or read from the disc at a rate that is different than the rate at which the data is being received from or provided to the host. For streaming data, which is data that is time-sensitive because it arrives at the disc drive or must be provided from the disc drive continuously and generally without interruption, such as audio/video data received through an Institute of Electrical and Electronics Engineers (IEEE) 1394 connection, buffers are important to maintain the data continuity and the data rate desired for streaming. When more than one data stream is to be handled, buffers are essential for allowing the drive to fill the buffer faster than it will be emptied or empty the buffer faster than it will be filled so that no interruptions occur for all streams being handled.

A portion of the buffer can be filling with streaming data, while data is being paced out of the buffer at a different rate. However, the buffer size used for the steaming data must be adequate or a loss of data from the stream or a break in the stream may result. For example, when data is streaming to the disc drive, if the buffer fills before the drive can begin writing the data to the disc, then data may be lost because there is no place for it to be stored. When data is streaming from the disc drive, if the buffer empties before the disc can begin filling the buffer with more data, then there may be a break in the streaming data while the buffer must reacquire some data from the disc prior to continuing to send it to the host.

Conventionally, the amount of buffer space to use for a given stream is selected so that its size is large enough to avoid a loss of or break in the streaming data. However, this conventional determination of buffer allocation is static. The amount of buffer space allocated for a particular stream initially does not change, even though a disc drive may need to handle more than one stream at a time and streams are continuously being added and/or terminated. Maintaining a static buffer size for each stream being handled becomes inefficient because the requirements for buffering change as the number of streams and/or stream characteristics change.

Because the buffer may be used by other processes of the disc drive in addition to handling one or more data streams, any buffer space not necessary for the data streams will aid the additional processes and/or will allow additional streams to be handled. Creating a static buffer allocation for the one or more data streams may either result in an inadequate amount of buffer space for each stream, or too much buffer space will be allocated and will not be available for the additional disc drive processes or additional streams. This is especially true when the number of data streams change but the buffer allocation for each previously existing stream does not.

Accordingly there is a need for a disc drive that can dynamically allocate buffer size while handling multiple streams of data.

SUMMARY OF THE INVENTION

Against this backdrop embodiments of the present invention have been developed. An embodiment of the present invention may be viewed as a method for handling multiple data streams in a disc drive. The method involves allocating a buffer size required by each data stream currently being handled and utilizing the buffer sizes that are allocated for corresponding data streams. When an additional data stream is to be added, the buffer size required by each data stream including the additional data stream is reallocated, and when a data stream currently being handled is to be terminated, the buffer size required by each data stream that will remain after the data stream is terminated is reallocated.

An embodiment of the present invention may also be viewed as a disc drive for handling multiple data streams. The disc drive includes one or more discs that store data and a buffer for outputting data streams to the one or more discs and for receiving data streams from the one or more discs. The disc drive also includes a processor in electrical communication with the buffer. The processor is configured to dynamically allocate the size of the buffer used for each data stream being handled by the disc drive by computing a buffer size required by each data stream currently being handled, by instructing the buffer to utilize the buffer sizes for corresponding data streams, by recomputing the buffer size required by each data stream including an additional data stream when an additional data stream is to be added, and when a data stream will be terminated, by recomputing the buffer size required by each data stream that will remain after a data stream is terminated.

These and various other features as well as advantages which characterize embodiments of the present invention will be apparent from a reading of the following detailed description and a review of the associated drawings.

DETAILED DESCRIPTION

Figure 1:
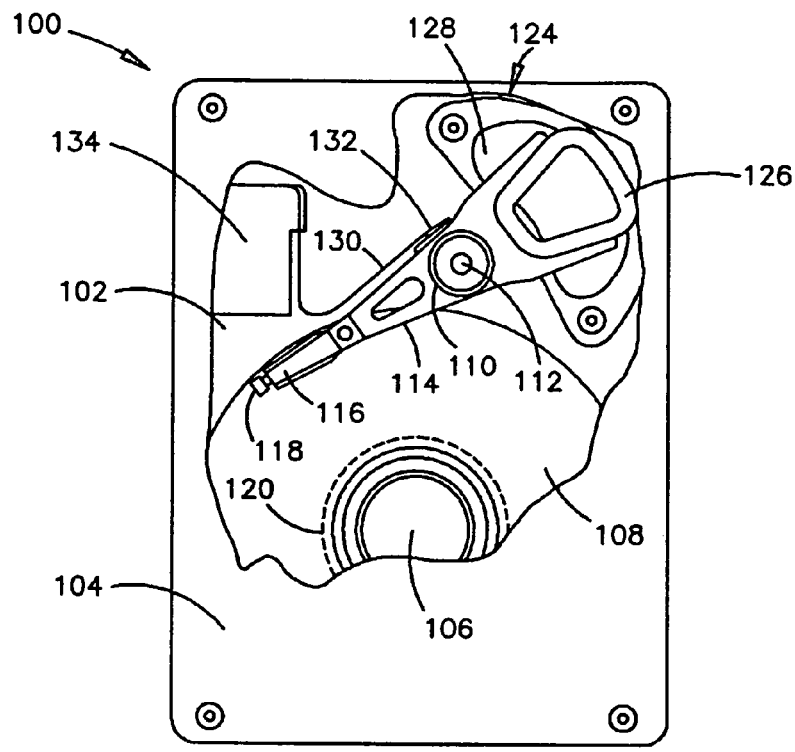
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
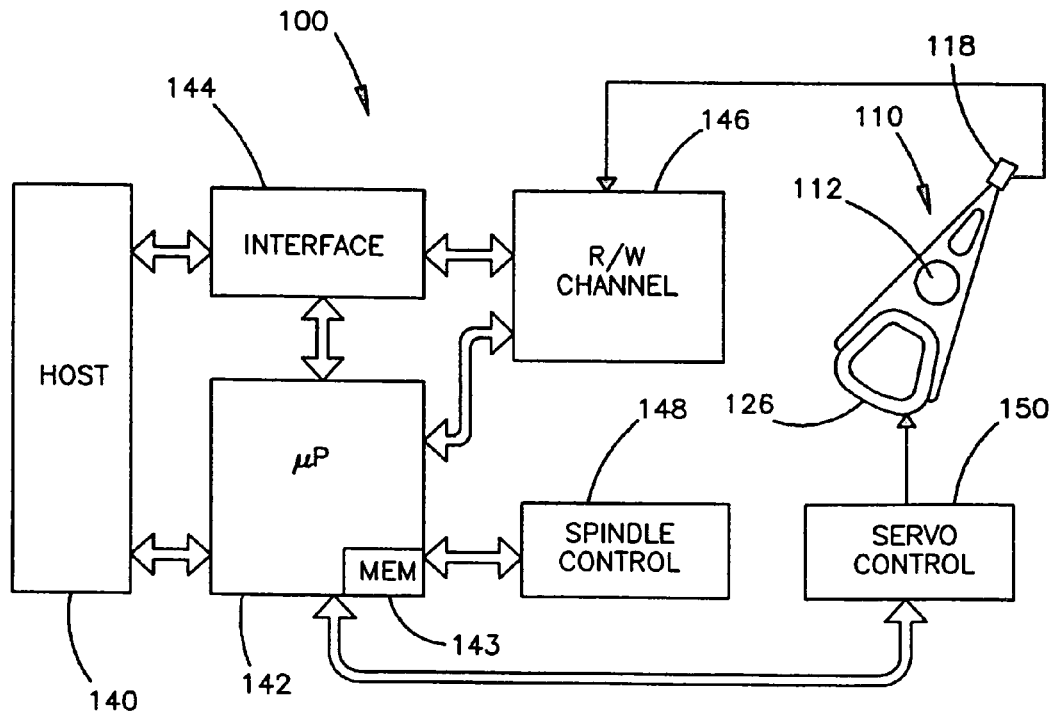
FIG. 2 is a block diagram of the main components of the disc drive embodiment of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which incorporates an electronic memory buffer, as discussed above, to facilitate high speed data transfer between the host computer 140 and the disc drive 100. Data to be written to the disc drive 100 is thus passed from the host computer 140 to the interface/buffer 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface/buffer 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
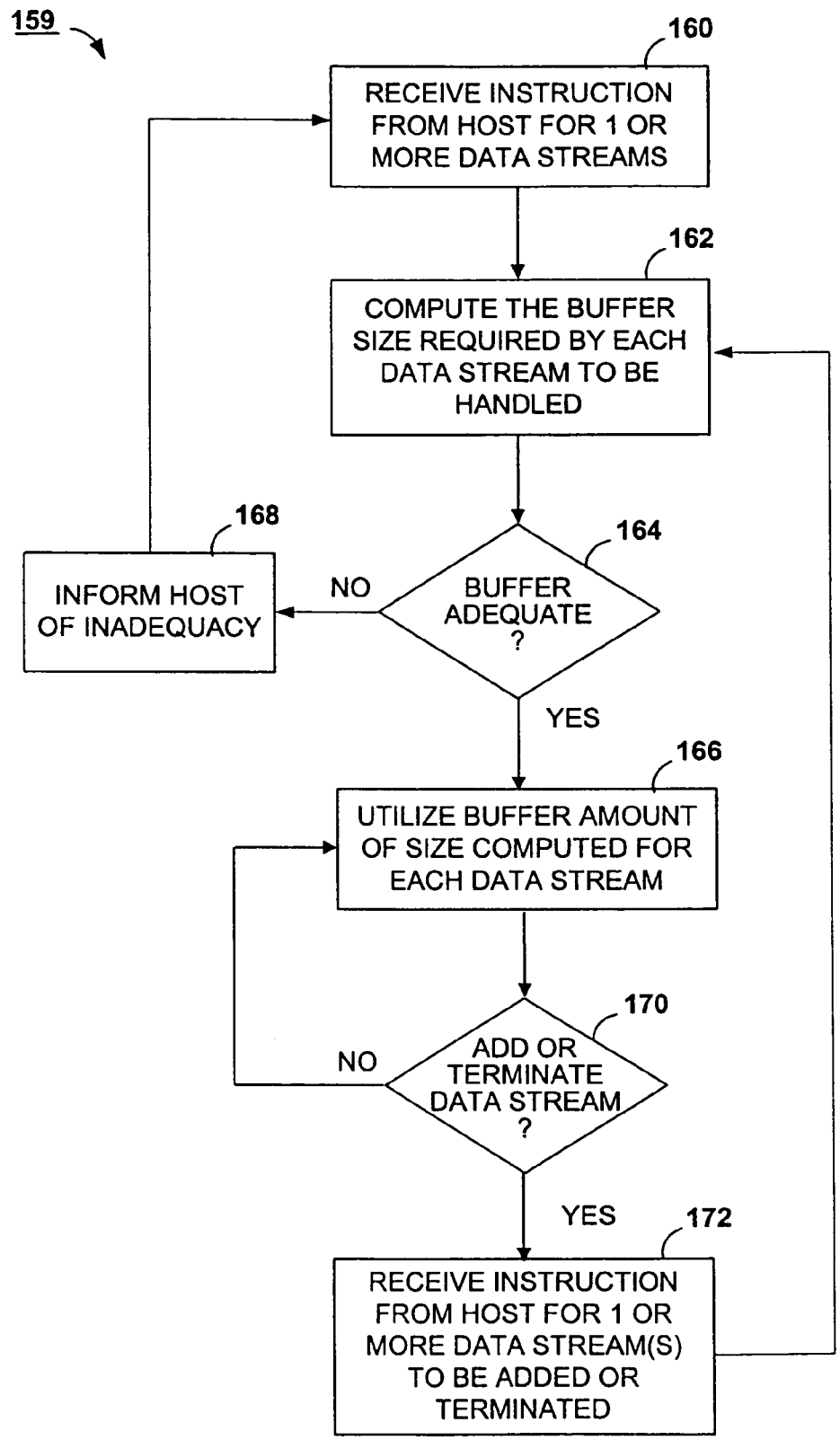
FIG. 3 is a flow chart of an embodiment of a dynamic buffer size allocation process involving multiple data streams that is employed by the disc drive of FIG. 1.

FIG. 3 shows an embodiment of the dynamic buffer allocation routine 159 employed by the microprocessor 142 of the disc drive 100 when handling multiple data streams. The dynamic buffer allocation routine allows the disc drive 100 to more efficiently utilize the buffer 144 so that the maximum amount of buffer space not needed by the one or more data streams is left available for additional data streams and/or other processes of the disc drive 100 such as general file accesses, file saves, etc.

The process begins at Receive operation 160 where the microprocessor 142 receives instructions from the host 140 regarding one or more data streams. The instruction generally provides the host data rate which is the rate at which the host 140 will provide data from a given stream to the buffer 144 of the disc drive 100. The host data rate may not be the same for each data stream being handled by the disc drive 100. The instruction may also contain a disc data rate, which is the rate at which the data of a given stream will be written from the buffer 144 to the disc 108. This disc data rate may be in the form of an instruction as to the particular zone of the disc 108 to store the data as the disc data rate varies for each zone of the disc 108 under a zone bit recording scheme. Alternatively, the disc drive 100 may make the determination of the disc rate achievable for the data stream(s) by selecting the particular zone of the disc 108 where the data will be stored under the zone bit recording scheme.

Once the number of data streams, the host data rate for each stream, and the disc data rate for each stream are known, the buffer size required for each stream is computed at Size operation 162. Computing the buffer size required for each stream involves several steps discussed in greater detail below with reference to FIG. 4. After the buffer size required by each data stream is known, the microprocessor 142 may detect whether the buffer 144 of the disc drive 100 is of an adequate size at Query operation 164 by comparing the sum of the buffer sizes for the data streams to the total buffer size available for use. If the sum of the buffer sizes is larger than what is available, then Inform operation 168 sends a signal from the disc drive 100 to the host 140 so that the host 140 may reduce the number of streams, reduce the host data rate of one or more streams, or perform some other process to reduce the amount of buffer space that will be required.

If Query operation 164 detects that the sum of the buffer sizes are not too large, then Utilize operation 166 causes the host 140 and/or disc 108 to begin supplying the data streams to the buffer 144 and causes the buffer 144 to utilize its space for each stream as designated by the computed buffer sizes from Size operation 162. The data streams may be streams that are received by the disc drive 100 from the host 140, streams that are being provided from the disc drive 100 to the host 140, or any combination. While the disc drive 100 is handling the one or more data streams, Query operation 170 detects whether the host 140 wishes to add or terminate a data stream.

If Query operation 170 detects that no data streams are to be added or terminated, then the disc drive 100 continues to utilize the previously computed buffer sizes to handle the current set of one or more data streams. If Query operation 170 detects that a data stream is to be added or terminated, then Receive operation 172 receives the instruction from the host 140 for the one or more streams to be added or terminated. If streams are to be added, then the host data rate and disc data rate are received.

After receiving the instruction from the host 140, the microprocessor 142 recomputes the buffer size for each data stream as operational flow returns to Size operation 162. If a new stream was added, then the computation at Size operation 162 accounts for the new stream. If an existing stream was terminated, then the computation accounts for the remaining streams. The dynamic buffer allocation process then continues by moving to Query operation 164, and repeats continuously so long as data streams are present.

Figure 4:
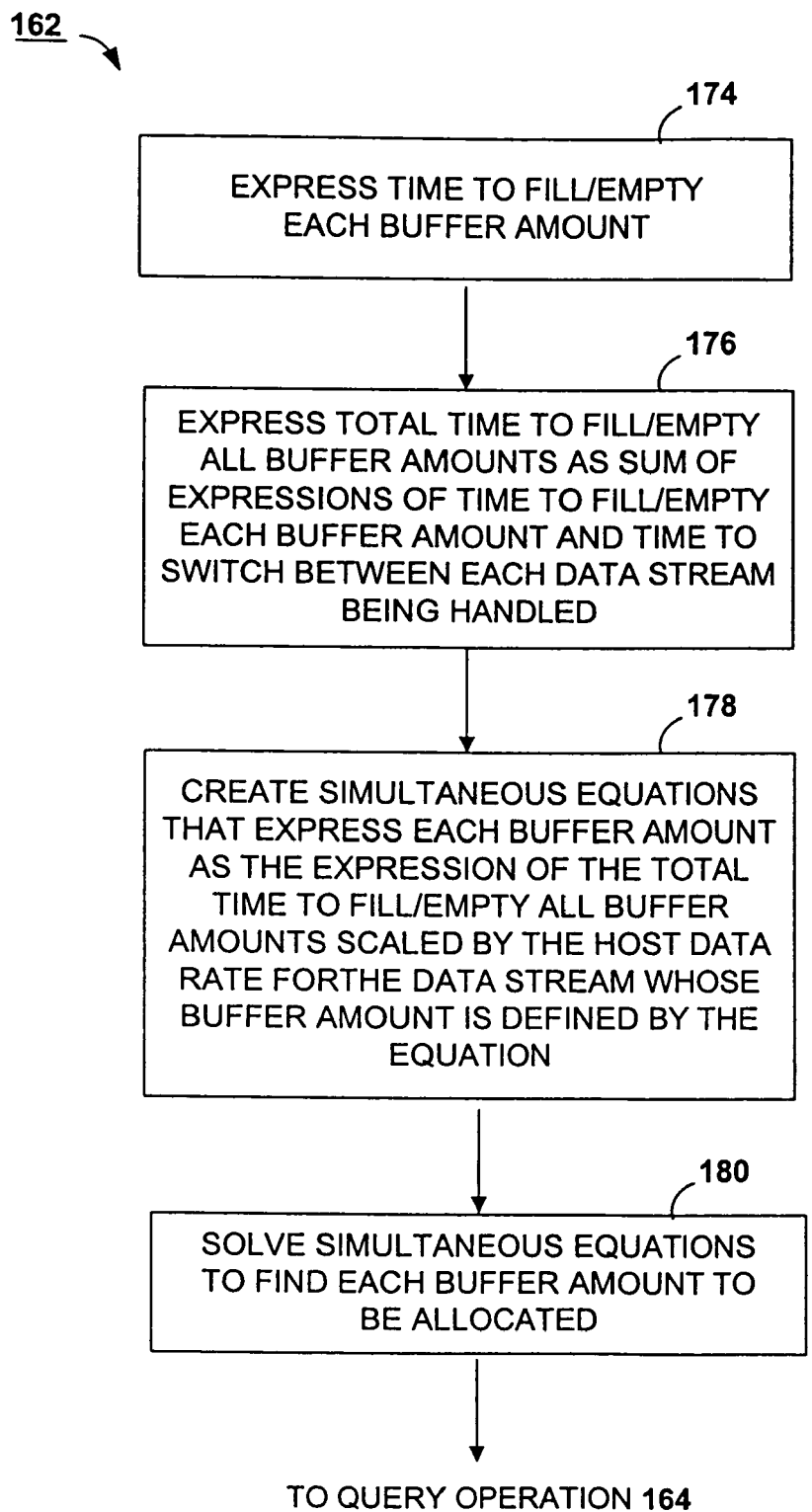
FIG. 4 is a flow chart of an embodiment of a buffer size computation subroutine of the dynamic buffer size allocation process of FIG. 3.

An embodiment of the Size operation 162 is shown in more detail in FIG. 4. Size operation 162 finds the requisite buffer size for each stream based on the idea that for each stream, while the buffer space for a stream is providing/receiving data for the stream to/from the host 140 and before this buffer space completely empties/fills, the drive must fill/empty the buffer space for that stream, switch to the next stream and fill/empty its buffer space, and so on until all streams' buffer spaces have been filled/emptied and the drive 100 switches back to the initial stream to fill/empty its buffer space once more.

The Size operation 162 begins by Stream Time operation 174 finding an expression for the time required to fill from the disc 108 or empty to the disc 108 each buffer amount to be allocated for the data streams. The amount of time to fill/empty the buffer amount allocated for a given stream is found by dividing the buffer amount to be dedicated for the stream by the disc data rate applied to the stream. If the nth data stream buffer amount is $B_n$ and the disc data rate for the nth data stream is $Rd_n$, then the time to fill/empty the nth stream is $B_n/Rd_n$. The buffer amount variable has an unknown value that must be found by creating simultaneous equations for each buffer amount and solving them as discussed below.

The Total Time operation 176 follows by finding an expression for the total time to fill/empty all of the buffer amounts to be allocated for the data streams. This expression includes the summation all of the times to fill/empty each allocated buffer amount for the data streams with the times to switch between data streams. Finding the time to fill/empty each stream is discussed above, and the time to switch between data streams includes the seek time, overhead, and rotational latency to get to the location on the disc 108 for the next stream. If the total time to empty or fill all buffers is T and the time to switch from stream n to stream n+1 is $Ts_n$, then the expression for the total time to fill/empty all allocated buffer amounts becomes:

$$T = \sum_{n=1}^{N} \left( \frac{B_n}{Rd_n} + Ts_n \right)$$

After finding the expression for T, Equation operation 178 creates simultaneous equations for the buffer amounts of all of the data streams. Each simultaneous equation is an expression for the buffer amount of a given data stream that is a function of all of the other buffer amounts for all other data streams. The equation for the buffer amount for a given data stream is the total time to empty/fill all buffer amounts scaled by the host data rate for the given data stream. If the host data rate is $Rh_k$, and N is the total number of data streams to be handled, then the expression for the kth data stream is $$B_k = Rh_k T = Rh_k \sum_{n=1}^{N} \left( \frac{B_n}{Rd_n} + Ts_n \right)$$

N simultaneous equations exist for N data streams and N unknown buffer variables. Solve operation 180 then solves the N simultaneous equations through ordinary techniques to find the N buffer variable values corresponding to the buffer amounts to be allocated to N data streams. The dynamic buffer allocation routine then proceeds to Query operation 164 from Size operation 162 as discussed above.

As data streams are added or terminated, the number and size of the buffer amounts computed by the Size operation 164 will change. The microprocessor 142 employs the buffer size for each data stream that is suitable for that stream at a given instant in time based on the total number of streams and their host and disc data rates. In this manner, the buffer is used efficiently by allowing only the buffer space that is actually required by the data streams to be allocated to them while leaving the remaining buffer space free for other processes and/or the addition of other data streams.

For example, in one scenario the disc drive 100 may be asked to handle two data streams. The first data stream has a host data rate of 3 megabytes per second (MB/s) and a disc data rate of 20 MB/s. The second data stream has a host data rate of 4 MB/s and a disc data rate of 24 MB/s, and it takes 30 milliseconds to switch from the first stream to the second stream and 30 milliseconds to switch from the second stream back to the first. The resulting expressions for the buffer size in MB/s for each data stream would be as follows:

$$B_1 = 3\left[\left(\frac{B_1}{20} + 0.03\right) + \left(\frac{B_2}{24} + 0.03\right)\right]$$

$$B_2 = 4\left[\left(\frac{B_1}{20} + 0.03\right) + \left(\frac{B_2}{24} + 0.03\right)\right]$$

Solving these simultaneous equations results in a buffer size of the first stream of about 343 buffer size of the second stream is about 257.2 KB.

Now in this scenario, the host 140 is requesting the disc drive 100 to handle an additional third stream. The third stream has a host data rate of 2 MB/s and a disc data rate of 30 MB/s. The time to switch from the second stream to the third stream is 20 milliseconds and the time to switch from the third stream back to the first stream is 36 milliseconds. The new resulting expressions for the buffer size in MB/s for each of the data streams would be as follows:

$$B_1 = 3\left[\left(\frac{B_1}{20}+0.03\right)+\left(\frac{B_2}{24}+0.02\right)+\left(\frac{B_3}{30}+0.036\right)\right]$$

$$B_2 = 4\left[\left(\frac{B_1}{20}+0.03\right)+\left(\frac{B_2}{24}+0.02\right)+\left(\frac{B_3}{30}+0.036\right)\right]$$

$$B_3 = 2\left[\left(\frac{B_1}{20}+0.03\right)+\left(\frac{B_2}{24}+0.02\right)+\left(\frac{B_3}{30}+0.036\right)\right]$$

Solving these simultaneous equations results in a buffer size of the first stream of about 403.5 KB. Buffer size for stream two is about 538 KB, and buffer size for stream three is about 237 KB. The addition of stream three increased the buffer size required for both stream one and stream two, and the disc drive 100 employing the dynamic allocation process then implements the new buffer sizes for streams one, two, and three until a stream is to be added or terminated.

In conclusion, an embodiment of the present invention may be viewed as a method (such as 159) for handling multiple data streams in a disc drive. The method involves a) allocating a buffer size required by each data stream currently being handled (such as 162) and utilizing the buffer sizes found in the allocating step a) for corresponding data streams (such as 166). The method further involves c) when an additional data stream is to be added, reallocating the buffer size required by each data stream including the additional data stream (such as 162), and d) when a data stream currently being handled is to be terminated, reallocating the buffer size required by each data stream that will remain after the data stream is terminated (such as 162).

The allocating step a) of the method (such as 159) may involve step a)(1) scaling a host data rate for a each data stream by an expression for a total time to fill or empty the buffer size allocated to all of the data streams being handled to create a set of simultaneous equations for the buffer sizes (such as 178) and step a)(2) solving the simultaneous equations to find the buffer size to be allocated for each data stream (such as 180). The scaling step a)(1) may involve step a)(1)(i) summing an expression for time to fill or empty the buffer size to be allocated for each data stream with a time to sequentially switch between each data stream to find the expression of total time to fill or empty the buffer size allocated to all of the data streams being handled (such as 176). The summing step a)(1)(i) may involve step a)(1)(i)(A) scaling a variable for the buffer size to be allocated for the first data stream by a disc rate assigned for the first data stream to find the expression for the time to fill or empty the buffer size to be allocated for the first data stream (such as 174).

The method (such as 159) may also involve step e) comparing a sum of the buffer size dedicated for each data stream to the total buffer size available for use (such as 164) and step f) detecting whether handling of the multiple data streams at a requested host data rate and disc data rate is possible from a result of comparing step e) (such as 164). The method may involve step g) receiving, by the disc drive, one or more of the data streams (such as 160) and step i) sending, by the disc drive, one or more of the data streams (such as 160). A sum of buffer sizes allocated for the data streams may be less than the total size of the buffer of the disc drive. The method may also involve step j) receiving, by the disc drive, data not in a stream and k) sending, by the disc drive, data not in a stream.

An embodiment of the present invention may also be viewed as a disc drive (such as 100) for handling multiple data streams. The disc drive includes one or more discs (such as 108) that store data and a buffer (such as 144) for outputting data streams to the one or more discs and for receiving data streams from the one or more discs. The disc drive also includes a processor (such as 142) in electrical communication with the buffer, the processor being configured to dynamically allocate the size of the buffer used for each data stream being handled by the disc drive by computing a buffer size required by each data stream currently being handled, instructing the buffer to utilize the buffer sizes for corresponding data streams, recomputing the buffer size allocated to each data stream including an additional data stream when an additional data stream is to be added, and when a data stream will be terminated, recomputing the buffer size allocated to each data stream that will remain after a data stream is terminated.

The processor (such as 142) of the disc drive (such as 100) may be configured to compute the buffer size required by each data stream currently being handled by scaling a host data rate for a first stream by an expression for a total time to fill or empty the buffer size dedicated to all of the data streams being handled to create a set of simultaneous equations for the buffer sizes and may be further configured to solve the simultaneous equations to find the buffer size for each data stream. The processor may be configured to sum an expression for a time to fill or empty the buffer size to be dedicated for each data stream with a time to sequentially switch between each data stream to find the total time to fill or empty the buffer size dedicated to all of the data streams being handled. The processor may be configured to scale a variable for the buffer size to be dedicated for the first data stream by a disc rate assigned for the first data stream to find the expression for the time to fill or empty the buffer size to be dedicated for the first data stream.

The processor (such as 142) of the disc drive (such as 100) may be further configured to compare a sum of the buffer sizes dedicated for each data stream to the total buffer size available for use, and detect whether handling of the multiple data streams at a requested host data rate and disc data rate is possible from a result of the comparison. One or more of the data streams may be received into the buffer (such as 144) at a host rate and are recorded to the disc (such as 108) at a disc rate, and wherein one or more of the data streams are received into the buffer at a second disc rate and are sent from the buffer at a second host rate. The processor is configured to compute a sum of buffer sizes allocated for the data streams that is less than the total size of the buffer of the disc drive. Data not in a stream may be received into the buffer and may be recorded to the disc, and data not in a stream may also be received into the buffer and may be sent from the buffer contemporaneously with the buffer utilizing the buffer sizes allocated by the processor.

It will be clear that embodiments of the present invention are well adapted to attain the ends and advantages mentioned as well as those inherent therein. While presently preferred embodiments have been described for purposes of this disclosure, various changes and modifications may be made which are well within the scope of the present invention. For example, the present invention may be implemented by a general-purpose programmable microprocessor 142 employed by the disc drive 100 or by special purpose hardwired logic functioning as a microprocessor 142. Numerous other changes may be made which will readily suggest themselves to those skilled in the art and which are encompassed in the spirit of the invention disclosed and as defined in the appended claims.

What is claimed is:

1. A method comprising:
   determining a buffer size for each of multiple data streams handled by a buffer based on data rate information for each of the data streams; and
   dynamically allocating space in the buffer to each of the data streams according to the determined buffer sizes,
   wherein the data rate information includes at least one of a data rate at which data is received into the buffer for a particular data stream and a data rate at which data is sent out of the buffer for a particular data stream.

2. The method of claim 1, wherein the data rate at which at least one of the data streams is received into the buffer is different than the data rate at which that data stream is sent out of the buffer.

3. The method of claim 1, wherein determining the buffer size for each data stream further comprises determining the buffer size of each data stream based on data rates at which the buffer receives each data stream.

4. The method of claim 1, wherein determining the buffer size for each data stream further comprises determining the buffer size of each data stream based on the data rates at which the buffer sends each data stream.

5. The method of claim 1, wherein determining the buffer size for each data stream further comprises determining the buffer size for each data stream based on the data rates at which the buffer receives and sends each data stream.

6. The method of claim 1, further comprising:
   receiving a request to add or terminate a data stream being handled by the buffer;
   determining a new buffer size for each data stream based on data rate information for the data streams that the buffer would handle after the requested data stream is added or terminated; and
   determining whether the sum of the determined new buffer sizes is larger than the available space in the buffer.

7. The method of claim 6, further comprising when the sum of the determined buffer sizes is not larger than the available space in the buffer, allocating space in the buffer according to the determined buffer sizes for each of the data streams that the buffer will handle after the requested change takes effect.

8. The method of claim 7, further comprising when the sum of the determined buffer sizes is larger than the available space in the buffer, increasing the available space in the buffer by reducing at least one data rate associated with at least one of the data streams.

9. The method of claim 7, further comprising when the sum of the determined buffer sizes is larger than the available space in the buffer, increasing the available space in the buffer by reducing the number of data streams being handled by the buffer.

10. The method of claim 1, wherein determining a buffer size for each of the multiple data streams further comprises determining a buffer size for each of the multiple data streams based on one or more times to switch between the data streams.

11. A computer-readable storage medium comprising instructions to cause a programmable processor to:
    determine buffer sizes corresponding to each of multiple data streams based on data rate information for each of the data streams; and
    dynamically allocate space in a buffer to each of the data streams according to the determined buffer sizes,
    wherein the data rate information includes at least one of a data rate at which data is received into the buffer for a particular data stream and a data rate at which data is sent out of the buffer for a particular data stream.

12. The computer-readable storage medium of claim 11, further comprising instructions to cause a processor to determine the buffer sizes based on data rates at which the buffer receives each data stream.

13. The computer-readable storage medium of claim 11, further comprising instructions to cause a processor to determine the buffer sizes based on data rates at which the buffer sends each data stream.

14. The computer-readable storage medium of claim 11, further comprising instructions to cause a processor to:
    receive a request to add or terminate at least one data stream;
    determine a new buffer size for each data stream based on data rate information for the data streams that the buffer would handle after the requested data stream is added or terminated;
    determine whether the sum of the determined new buffer sizes is larger than the available space in the buffer; and
    when the sum of the determined buffer sizes is not larger than the available space in the buffer, allocate space in the buffer according to the determined buffer sizes for each data stream that the buffer will handle after the requested change takes effect.

15. The computer-readable storage medium of claim 11, further comprising instructions to cause a processor to determine the buffer sizes based on one or more times to switch between the data streams.

16. A system comprising:
    a buffer configured to handle multiple data streams;
    means for determining a buffer size for each data stream based on data rate information for each of the multiple data streams; and
    means for dynamically allocating space in the buffer to each of the data streams according to the determined buffer sizes,
    wherein the data rate information includes at least one of a data rate at which data is received into the buffer for a particular data stream and a data rate at which data is sent out of the buffer for a particular data stream.

17. The system of claim 16, wherein the data rate information includes data rates at which the buffer receives each data stream.

18. The system of claim 16, wherein the data rate information includes data rates at which the buffer sends each data stream.

19. The system of claim 16, wherein the means for determining a buffer size is further for determining the buffer sizes based on one or more times to switch between the data streams.

* * * * *